UNITED STATES PATENT OFFICE.

MAX HARTUNG, OF BERLIN, GERMANY.

PROCESS OF MAKING ARTIFICIAL STONE.

1,042,113.   Specification of Letters Patent.   Patented Oct. 22, 1912.

No Drawing.   Application filed January 26, 1912. Serial No. 673,516.

*To all whom it may concern:*

Be it known that I, MAX HARTUNG, a citizen of the German Empire, residing at Berlin, in the Kingdom of Prussia, Germany, have invented certain new and useful Improvements in a Process of Making Artificial Stone; and I do hereby declare the following to be a full, clear, and exact description of the invention, such as will enable others skilled in the art to which it appertains to make and use the same.

My invention relates to improvements in the process of making artificial stone.

Heretofore efforts have been made to make artificial stone, particularly marble, by adding to the dry raw materials only so much water as is required for binding. However thereby a material is obtained which is not uniformly wet and which contains clods, so that a good stone can not be made therefrom. For this reason it has been tried to make artificial stone of the character of the marble by adding a surplus of water to the raw material. However, when leaving the whole surplus of water within the mass stones of very little strength and durability are obtained. Therefore it has been suggested to remove the surplus water by pressure or by suction after bringing the mass into the mold.

I have discovered, that when thus separating the water after molding the material fine pores are frequently produced which impair the strength and the durability of the product. Furthermore the process is objectionable, because the pressing plunger must be guided in a tight way in the mold, so that the manufacture at a large scale is impossible. The main objection to the old process resides in the fact, that the manufacture of artificial stone of different color, such for example as grained marble, can not be produced, because the different dye stuffs are intermingled when pressing the stone, so that good grains can not be obtained. Furthermore the use of a mass containing much water is unsuitable for relief and other work.

The object of my improvements is to provide a process which is free of the above objections. And with this object in view my invention consists in adding to the raw material an excess of water and removing the same prior to molding the mass. This may be done in different ways. By reason of the simplicity of the method I prefer to put the wet mass into porous bags and to subject the same while within the bags to pressure. Such pressure may be produced in different ways. A convenient way consists in subjecting the mass to centrifugal action. Another method of separating the water consists in putting the mass into receptacles having filtering walls and subjecting the same to pressure.

In making artificial stone by my improved process I prefer to proceed as follows: The hydraulic binding medium, such for example as gypsum or hydraulic cement, is mixed with much water, whereupon the raw material is allowed to deposit. Thereby lighter impurities are separated from the material, which is particularly advantageous where hydraulic cement is used, because afterward sweating and discoloring of the artificial stone is avoided. After the water has been decanted, the mass is brought into a bag and the surplus liquid is separated by pressure. Thereby a mass is obtained which has the consistency and homogenity of slightly wetted clay.

Where it is desired to make artificial marble having different colors, I make masses having different colors, and I separate each mass as desired into bodies of greater or less size. These bodies are brought together, whereupon suitable dye stuffs, preferably in a powdered state, for example black ones, green ones, etc., are spread over the same. As the mass is free of water, the dye stuffs do not intermingle with the foundation color of the clods, so that after combining the clods the dye stuffs produce sharp grains which resemble those of the natural marble.

By my improved process I am able to produce strong and durable artificial stones which are almost entirely free of pores. Furthermore I am able to thoroughly and uniformly wet the foundation material and to impart thereto a determined degree of moisture which best corresponds to the requirements of each composition. For example I may deprive the mass of the liquid to such an extent, that very hard and strong stones are produced without removing the liquid from the mass in the mold by pressure.

The process is particularly advantageous where substances such as hydraulic cement are used which bind very rapidly and which eagerly take up water and then can not be pressed again. Experiments have shown, that by my improved process artificial stones which resemble marble can easily be manufactured, which heretofore was impossible.

I claim herein as my invention:

1. The herein described process of making artificial stone, which consists in adding much water to the mass from which the stone is to be made, removing the water from the mass separating the dried mass into clods, spreading a dyestuff over the clods, putting the clods together, and molding the mass which has thus been combined.

2. The herein described process of making artificial stone, which consists in adding much water to the mass from which the stone is to be made, removing the water from the mass, separating the dried mass into clods, spreading a dry powdered dyestuff over the clods, putting the clods together, and molding the mass which has thus been combined.

3. The herein described process of making artificial stone, which consists in adding much water to the mass from which the stone is to be made, removing the water from the mass, separating the dried mass into clods, dyeing the clods with different foundation colors, spreading a dye stuff over the clods, putting the same together, and molding the mass which has thus been again combined.

4. The herein described process of making artificial stone, which consists in adding much water to the mass from which the stone is to be made, removing the water from the mass, separating the dried mass into clods, dyeing the clods with different foundation colors, spreading a dry powdered dye stuff over the clods, putting the same together, and molding the mass which has thus been again combined.

In testimony whereof I have hereunto set my hand.

MAX HARTUNG.

Witnesses:
WOLDEMAR HAUPT,
HARRY L. WILSON.